United States Patent Office 2,895,910
Patented July 21, 1959

2,895,910

FIRE FIGHTING FOAMS

Robert Ralph Merton, Richard Henry McDowell, and John Goldring Aylett, London, England, assignors to Alginate Industries Limited, London, England, a British company No Drawing. Application April 2, 1956
Serial No. 575,331

Claims priority, application Great Britain April 7, 1955

22 Claims. (Cl. 252—3)

This invention comprises improvements in fire-fighting foams.

It is an object of the invention to provide a solution, capable of more effective use than known solutions, in extinguishing fires.

A generally used method of extinguishing burning liquids is to apply water which has been made into a foam with air, so that it will float on the surface of the liquid, the foam being stabilised with one or more of a number of foam stabilising agents, for example a hydrolysed protein. While there are many compounds suitable for stabilising foams which are intended to extinguish burning liquids which do not mix with water, most of the foams are destroyed by contact with water miscible inflammable liquids such as the lower alcohols and ketones.

One known method of preparing a foam suitable for extinguishing a burning liquid which is miscible with water is to include in the water to be foamed a soluble alginate as well as the foam stabilising compound. For example, water which has dissolved in it a hydrolysed protein and sodium alginate can be expanded to several times its original volume by the incorporation of air, forming a foam which is stable on burning ethyl alcohol, whereas a foam similar in other respects but without the alginate is rapidly destroyed by contact with the alcohol. The solution used to make the foam is usually prepared when it is required by diluting a concentrated preparation with water. While the use of sodium alginate gives excellent results when soft water is available for dilution, difficulties have hitherto been encountered when hard water has been used. This is probably due to calcium in the water combining with the alginate to form insoluble calcium alginate so that no alginate or a reduced quantity remains in solution. Enough calcium to combine with about a third of the alginate will render the greater part of it insoluble, so that a water of calcium hardness 50 parts per 100,000 expressed as calcium carbonate will render the alginate insoluble if less than about 0.65 percent of sodium alginate is included in the mixture. As the amount of sodium alginate found satisfactory in soft waters is smaller than this, a compound prepared for use in soft water is not satisfactory when diluted with hard water. The inclusion of substances commonly used for water softening give unsatisfactory results. Alkaline materials such as sodium carbonate or trisodium phosphate reduce the stability of the foam. Glassy sodium metaphosphate can be used only if the amount is adjusted exactly to the hardness of the water, as an excess reduces the stability of foams containing commonly used hydrolysed protein compounds.

It is an object of the present invention to provide a fire-extinguishing foaming composition which overcomes these difficulties. It is a further object of the invention to provide a fire-extinguishing foaming composition which will operate successfully on a wide range of water-miscible organic combustible liquids as well as liquid mineral fuels and irrespective of the hardness of the water with which it is used to form a foam.

Hydrolysed proteins frequently contain iron salts, which are included to improve their stability and we have found that a fire-extinguishing foaming solution containing hydrolysed protein with iron salts, sodium alginate and sodium fluoride is effective in producing foam which will put out fires on burning water-miscible liquid such as ethyl alcohol, even when the foam is produced by aeration and dilution with water of 50° calcium hardness.

It has been found by us that the presence of the iron not only enhances the effectiveness of the hydrolysed protein foam but also renders the alginate component more effective as is evidenced by the fact that a foam made with a fire foam compound based on a synthetic detergent instead of hydrolysed protein and containing alginate was not stable on certain water miscible organic liquids. However, a foam made from a similar compound containing ferrous iron was stable. It was furthermore found, with the protein compound, that by increasing the quantity of ferrous iron above that required to improve the hydrolysed protein, the stability of the foam was improved so that the compound could be used in a less concentrated state. The function of the sodium fluoride appears to be to prevent the calcium in hard water from hindering solution of the alginate therein.

The effectiveness of the foam on water-miscible liquids is believed to be the result of the formation in contact with the alcohol or like liquid of a gelatinised precipitate of alginate which protects the floating foam from penetration by the water-miscible liquid on which it rests.

We have further found that a number of mixed salts of alginic acid which are soluble in water are much more sensitive to precipitation by water-miscible solvents than are the soluble alginic acid salts of a single base, as for example sodium alginate. The mixed salts of alginic acid which are suitable are of a composition corresponding to mixtures of one or more simple water-soluble salts of alginic acid with one or more substantially water-insoluble salts of alginic acid. The mixed alginate salt will behave as a single substance and, according to the proportions of base tending to make the mixed salt soluble or insoluble, the whole of the alginate will be soluble or insoluble in water. The iron salts in hydrolysed protein referred to above (which are ferrous salts) are among those which produce with sodium alginate a soluble double salt effective to form a gelatinous precipitate on water-miscible liquids, but salts of other metals are even more effective. For example manganese and cobalt salts together with sodium salts are particularly effective in forming a mixed salt of alginic acid which is easily precipitated by methyl ethyl ketone, and the fluorides of manganese and cobalt are sufficiently soluble to allow sodium fluoride to be included in the mixture to precipitate the much less soluble calcium fluoride.

From this it may be seen that the substance used to prevent the calcium in hard water from hindering solution of alginate must be selected in conjunction with the salt (such as one of manganese, cobalt or iron) used to render the alginate sensitive to precipitation so that they do not interfere with one another.

If ferrous salts are used, care should be taken to avoid oxidation to ferric salts, as the amount of ferric salts which can be used with success in the production of ferric-sodium mixed alginate soluble in water is much less than with ferrous salts and therefore the balance for forming a gelatinised precipitate is upset by oxidation. More ferrous salt is required to sensitise the alginate to precipitation on burning liquids than is the case when manganese or cobalt salts are used. Iron salts produce a less stable foam than the salts of the other metals mentioned. For all these reasons, while their use is within the scope of this invention, they are not preferred.

There is therefore envisaged according to the invention a fire-extinguishing foam compound, comprising a foaming agent, a mixed salt of alginic acid corresponding in composition to a mixture of one or more simple salts of alginic acid which are water-soluble and of one or more substantially water-insoluble alginates, in such proportions that the mixed salt is soluble in water, and a substance which will sequester or precipitate calcium ions but will leave substantially unprecipitated and unsequestered at least one solubilising and one insolubilising base in the mixed alginate.

The proportions of the bases combined with the alginate which will allow the alginate to be soluble in water but to be sensitive to precipitation by water-miscible liquids varies with the nature of the bases and is best determined by experiments which include the other ingredients required. It will generally be the case that sodium or other alkali-metal salts which tend to give soluble alginates will be present in the fire foam compound, and the composition of the mixed alginate salt at the time of precipitation will be dependent on the balance of soluble ionised salts in the solution. The mixed salt of the alginic acid will therefore be produced by including in the mixture an amount of a salt which tends to precipitate the alginate which is related to the amount of salt which tends to keep the alginate in solution. The total quantity of salts present may be determined by other considerations, as for example the necessity for keeping the alginate in the concentrated fire foam compound in suspension.

It will be understood that the proportions of solubilising salts and insolubilising salts are to be such that the mixed alginate will be soluble in the fire foam composition when it has been diluted and is ready for foaming. In the concentrated compound there will be present also, substances which render the mixed alginate substantially insoluble but sufficiently hydrated to prevent settling out, but in such concentration that they do not prevent the mixed alginate from dissolving when the compound is diluted to produce a composition for foaming; such substances may be inorganic salts as described in United States patent application Serial No. 547,851, or they can be water miscible organic liquids as for example ethyl or isopropyl alcohol.

Foams for fire fighting purposes are commonly prepared by inducing a concentrated fire foam compound and air into the water stream by means of a foam producing branch pipe. For this method a compound in which the alginate is held in suspension during storage but dissolves rapidly on meeting the water stream as previously mentioned, is particularly convenient. On the other hand, it is sometimes convenient to hold a fire fighting mixture at a suitable concentration for foaming without further dilution, and the present invention enables improved results to be obtained in these conditions also. Using suitable proportions of solubilising, insolubilising and calcium precipitating or sequestering salts a prediluted solution can be prepared according to this invention when required, irrespective of the composition of the water locally available.

The following are among the combinations of mixed alginates and calcium sequestering or precipitating agents which can be employed:

Sodium/ferrous iron—with sodium fluoride
Sodium/manganese—with sodium fluoride
Sodium/cobalt—with sodium fluoride
Sodium/nickel—with sodium fluoride
Ammonium/manganese—with sodium fluoride
Sodium/ferrous iron/manganese—with sodium fluoride
Sodium/manganese—with sodium oxalate
Sodium/iron in hydrolysed protein—with sodium fluoride The following are given by way of examples of fire-extinguishing foaming compositions in accordance with the invention:

Example I

To 3 gals. of fire-fighting compound made by the alkaline hydrolysis of blood, containing ferrous iron salts, and sold under the trade name "Nicerol," was added 5½ lbs. of finely ground sodium alginate (90% dry matter content) and 1½ lbs. of sodium fluoride. The mixture was then diluted with 97 gals. of water and expanded to 4 times its original volume with air. The resulting foam was effective in extinguishing burning ethyl alcohol and petrol whether the water used for dilution was soft or of 50° calcium hardness.

In comparison with this example according to the invention, if "Nicerol" compound was employed without the addition of sodium alginate and sodium fluoride, the foam, while effective in extinguishing burning petrol, was ineffective on burning ethyl alcohol, whether the water used for dilution was soft or hard. When sodium alginate was used without sodium fluoride in hard water, the results were similar, i. e. effective on petrol but not on burning ethyl alcohol. The combination of all the ingredients stated was therefore necessary for a fully effective foaming composition.

Example II

This is an example of a fire-fighting foam composition for use by subsequent dilution with water. It contains a hydrolysed protein, sodium alginate, ferrous iron and a fluoride together with salts necessary to give a stable suspension of the alginate.

A solution is first prepared containing 6 lbs. of sodium chloride and 1½ lbs. of sodium fluoride in 27½ lbs. of water. 5 lbs. of finely ground sodium alginate (90% dry matter) is stirred into this solution in which it will not dissolve. It is then mixed with 25 lbs. of a 2% by weight solution of sodium alginate. 30 lbs. of a commercial hydrolysed protein solution sold for fire extinguishing purposes and containing 30% to 35% of solids by weight is then mixed with a solution of 3 lbs. of ferrous sulphate crystals in 7 lbs. of water. The alginate portion and the hydrolysed protein portion are then mixed; this gives a foam compound in which the alginate remains as a stable suspension.

8 parts by volume of this solution mixed with 92 parts by volume of water gives a mixture which can be foamed with air to about four times its original volume yielding a foam which will extinguish burning lower alcohols irrespective of the hardness of the water used for dilution.

Example III

This is an example of a fire extinguishing composition of concentration suitable for foaming with air by mechanical means. It contains a synthetic detergent, sodium alginate, ferrous iron and a fluoride. 5 lbs. of sodium alginate of the type sold under the name of Manucol SS/LH is first dissolved in 150 lbs. of water. In a further 500 lbs. of water is dissolved 10 lbs. of ferrous ammonium sulphate and 1½ lbs. of sodium fluoride. The sodium alginate solution is then mixed with the iron and fluoride solution and 12½ lbs. of the synthetic detergent sold under the name of Teepol 410 is added. "Teepol" is the trade name for a solution in water of mixed oil refinery products and consists of mixed long-chain secondary alkyl sulphates 21% and water 79%. Water is then added to give a total weight of 1000 lbs. The water used for dilution can have any hardness between 0 and 100° expressed as parts of calcium carbonate per 100,000. The solution so prepared can be stored, and can be foamed mechanically by the introduction of air to give a foam stable on burning water-miscible liquids.

Example IV

This is an example of a fire-fighting foam compound for use by subsequent dilution with water. It contains hydrolysed protein, sodium alginate, cobalt and a fluoride together with salts necessary to give a stable suspension of the alginate.

A solution is first prepared containing 4½ lbs. of sodium chloride and 1½ lbs. sodium fluoride in 40 lbs. of water. 5 lbs. of finely ground sodium alginate (90% dry matter) is stirred into this solution. It is then mixed with 25 lbs. of a 2% by weight solution of sodium alginate.

The hydrolysed protein compound used is prepared by the partial hydrolysis of soya bean meal with caustic soda and after neutralisation and filtration it is concentrated to a solids content of about 35%. To 20 lbs. of this hydrolysed protein concentrate is added 1.2 lbs. of cobalt nitrate crystals ($Co(NO_3)_2.6H_2O$) dissolved in 2.8 lbs. of water. This solution is then mixed with the alginate suspension to give a stable foam compound.

10 parts by volume of this solution mixed with 90 parts by volume of water gives a mixture which can be foamed with air to about 4 times its original volume to give a foam which will extinguish a wide range of water-miscible burning liquids irrespective of the hardness of the water used for dilution.

*Example V*

This is an example of a fire foam compound for use by subsequent dilution with water. It contains hydrolysed protein, sodium alginate, ferrous iron, manganese and a fluoride together with salts necessary to give a stable suspension of the alginate. The alginate portion of the mixture is prepared in exactly the same way as in Example IV.

The foaming agent is prepared by the partial hydrolysis of blood with caustic soda and concentration after neutralising and filtering to give a solids content of about 35%. This product contains some iron which was originally present in the blood but a further quantity is added as well as manganese. To 20 lbs. of the hydrolysed protein is added 0.6 lb. of ferrous sulphate crystals ($FeSO_4.7H_2O$) dissolved in 1.4 lbs. of water and 1 lb. of manganese sulphate ($MnSO_4.4H_2O$) dissolved in 2 lbs. of water, and 1 oz. of hydrazine sulphate as an anti oxidant. 2 oz. of sodium pentachlorphenate are added to the alginate portion as a preservative and the complete compound is made by mixing together the alginate portion and the hydrolysed protein portion.

Used at a dilution of one part fire foam compound in 9 of water (the water used may have any usual degree of hardness) and foamed mechanically to 4 times its original volume, a foam suitable for extinguishing fires on water-miscible liquids is obtained.

We claim:

1. A fire-fighting foam composition comprising as its essential ingredients an aqueous solvent, a foaming agent, a mixed salt of alginic acid corresponding in composition to a mixture of at least one simple water soluble salt of alginic acid comprising between 50 and 80% of the total alginate, and at least one substantially water insoluble salt of alginic acid and a metal, said metal being selected from the group consisting of iron, manganese, and cobalt and comprising between 50 and 20% of the total alginate, so that the mixed salt is soluble in the composition prior to foaming, and a water soluble fluoride which functions to selectively remove $Ca++$ ions from solution in the presence of iron, manganese, and cobalt irons.

2. A fire-fighting foam composition as in claim 1 in which the foaming agent is a non-ionic synthetic detergent.

3. A fire-fighting foam composition as in claim 1 in which the water soluble fluoride is sodium fluoride.

4. A fire-fighting foam composition as in claim 1 in which the mixed salt of alginic acid contains sodium.

5. A fire-fighting foam composition as in claim 1 in which the mixed salt of alginic acid contains ammonium.

6. A fire-fighting foam composition as in claim 1 in which the mixed salt of alginic acid contains potassium.

7. A fire-fighting foam composition as in claim 1 in which the mixed salt of alginic acid contains iron.

8. A fire-fighting foam composition as in claim 1 in which the mixed salt of alginic acid contains manganese.

9. A fire-fighting foam composition as in claim 1 in which the mixed salt of alginic acid contains cobalt.

10. A fire-fighting foam composition as in claim 1 in which the mixed salt of alginic acid contains nickel.

11. A fire-fighting foam composition as in claim 1 in which the mixed salt of alginic acid contains sodium and iron.

12. A fire-fighting foam composition as in claim 1 in which the mixed salt of alginic acid contains sodium and manganese.

13. A fire-fighting foam composition as in claim 1 in which the mixed salt of alginic acid contains sodium and cobalt.

14. A fire-fighting foam composition as in claim 1 in which the mixed salt of alginic acid contains sodium and nickel.

15. A fire-fighting foam composition as in claim 1 in which the mixed salt of alginic acid contains sodium, iron and manganese.

16. A fire-fighting foam composition as in claim 1 in which the mixed salt of alginic acid contains sodium, iron and cobalt.

17. A fire-fighting foam composition as in claim 1 in which the mixed salt of alginic acid contains sodium, iron and nickel.

18. A fire-fighting foam composition as in claim 1 in which the foaming agent is a hydrolysed protein.

19. A fire-fighting foam composition as in claim 1 in which the foaming agent is an anionic synthetic detergent.

20. A fire-fighting foam composition as in claim 1 prepared in concentrated form for subsequent dilution, in which part of the alginate is held as a suspension which dissolves on dilution with water.

21. A fire-fighting foam composition as in claim 20, in which the part of the alginate which is held as a suspension is kept out of solution in the form of a stable suspension, prior to dilution with water, by the inclusion of a sufficient quantity of water soluble salts.

22. A fire-fighting foam composition as in claim 21, wherein the water soluble salts consist of at least 5% of sodium chloride reckoned on the total weight of the composition.

References Cited in the file of this patent

UNITED STATES PATENTS

| 2,232,053 | Daimler | Feb. 18, 1941 |
| 2,420,308 | Gates | May 13, 1947 |
| 2,653,106 | Bonniksen | Sept. 22, 1953 |

FOREIGN PATENTS

| 784,211 | Great Britain | Apr. 25, 1956 |